Figure 1:
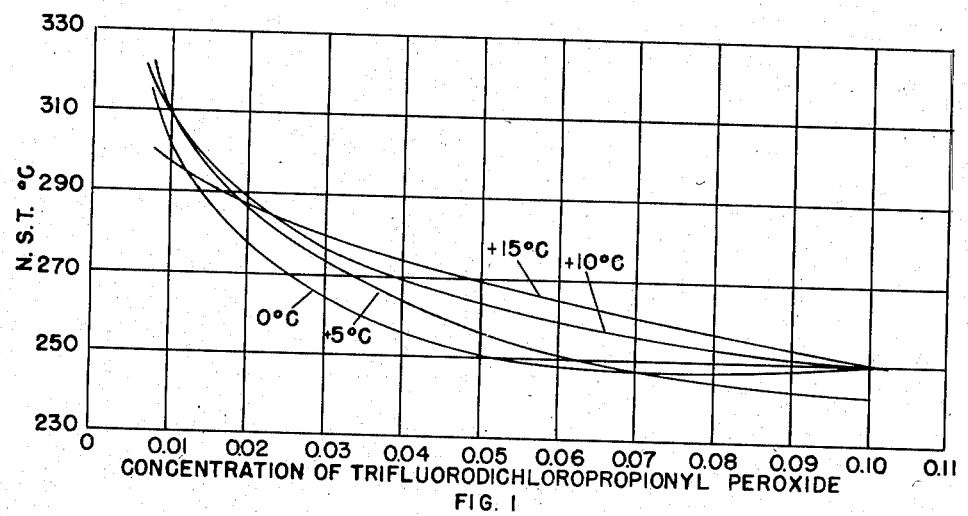

INVENTORS
ALBERT L. DITTMAN
JOHN M. WRIGHTSON
BY
ATTORNEYS

United States Patent Office 2,705,706
Patented Apr. 5, 1955

2,705,706

POLYMERIZATION OF PERHALOCARBONS WITH TRIFLUORODICHLOROPROPIONYL PEROXIDE

Albert L. Dittman, Jersey City, N. J., and John M. Wrightson, Whittier, Calif., assignors to The M. W. Kellogg Company, Jersey City, N. J., a corporation of Delaware Application May 11, 1951, Serial No. 225,850

2 Claims. (Cl. 260—92.1)

This invention relates to the manufacture of perhalocarbons. In one of its aspects, the invention relates to the manufacture of perhalocarbon plastics, oils, greases and waxes. More particularly in this aspect, the invention relates to a method for the polymerization of perhalo-olefins to produce normally liquid and solid perhalo-polymers. Still more particularly in this latter aspect, the invention relates to a method for the polymerization of trifluorochloroethylene to produce normally liquid and solid polymers of this monomer.

This invention is a continuation-in-part of our prior and copending application Serial No. 98,276, now U. S. Patent No. 2,636,908, filed June 10, 1949; and is also a continuation-in-part of our prior and copending application Serial No. 157,268, filed April 21, 1950, in which we are co-inventors with Oscar A. Blum.

Normally liquid and solid perhalocarbons have been produced by the polymerization of a monomer in the presence of certain promoters, and, in the case of liquids, also in the presence of a chain-transfer solvent. For example, under suitable conditions of temperature and residence time, and in the presence of trichloroacetyl peroxide, trifluorochloroethylene can be polymerized to obtain chemically and physically stable, solid polymers having a variety of uses. Benzoyl peroxide has been employed to produce liquid polymers. The disadvantages of these promoters in comparison with the promoters of the present invention, resides in their being more expensive to produce, and in being unstable at relatively high temperatures. In the case of benzoyl peroxide, there is the further disadvantage that the fragments of promoter attached to the polymer contain hydrogen which makes the polymer less stable.

It is, therefore, an object of the present invention to polymerize perhalo-olefins under suitable conditions in the presence of a new promoter to produce perhalo-polymers.

Another object of the invention is to provide an improved method for producing perhalo-olefin polymers of predetermined chemical and physical characteristics and high yields.

Still another object of the invention is to provide an improved method for producing polymers of trifluorochloroethylene.

A further object of the invention is to provide a novel promoter suitable for use in the polymerization of perhalo-olefins to produce perhalo-polymers.

A still further object of the invention is to provide a method for producing a novel promoter suitable for use in the polymerization of perhalo-olefins to produce perhalo-polymers.

Various other objects and advantages of the present invention will become apparent to those skilled in the art from the accompanying description and disclosure.

As herein employed, perhalocarbons are defined as compounds consisting substantially exclusively of carbon and halogen with any degree of unsaturation and containing only negligible amounts of other elements, such as hydrogen and oxygen, in a quantity less than about 2 weight per cent as impurities. These other elements are derived from materials utilized in the process as will hereinafter become apparent. Perhalo-olefins are defined as perhalo-olefins having any degree of unsaturation, and consisting of halogens and carbon. Perfluoro-olefins are defined as perhalo-olefins having any degree of unsaturation and consisting of fluorine and carbon. Perfluorochloro-olefins are defined as perhalo-olefins consisting of fluorine, chlorine and carbon. The preferred perfluorochloro-olefins of this invention are those containing not more than one chlorine atom per carbon atom.

According to this invention, perhalo-olefins are homopolymerized or copolymerized under suitable polymerization conditions in the presence of a halogenated acyl peroxide, viz., trifluorodichloropropionyl peroxide as a promoter, to produce oils and greases at normal atmospheric temperature, and waxes, including hard waxes having softening points extending to about 200 C., and normally solid material of the nature of thermal plastics, in high yields with good selectivity for the desired product.

The perhalo-olefins which may be homopolymerized or copolymerized in accordance with the process of the invention include perfluoro-olefins and perfluorochloro-olefins, such as trifluorochloroethylene, tetrafluoroethylene, perfluorobutadiene, difluorodichloroethylene including both $CF_2=CCl_2$ and $CFCl=CFCl$, perfluoropropene, perfluoromonochloropropene, perfluorobutene, perfluoromonochlorobutene, diphenyldifluoroethylene, etc. Typical examples of copolymerization of the above perhalo-olefins include the copolymerization of trifluorochloroethylene and fluorochloroisobutene; of trifluorochloroethylene and diphenyldifluoroethylene; of trifluorochloroethylene and tetrafluoroethylene; of trifluorochloroethylene and vinylidene fluoride; of trifluorochloroethylene and vinyl fluoride; of trifluorochloroethylene and vinyl chloride; of trifluorochloroethylene and vinylidene chloride; of trifluorochloroethylene and perfluoropropene; of trifluorochloroethylene and trifluoroethylene; and of perfluorobutadiene and perfluorostyrene, etc.

The term "polymerization" includes, in its broadest sense, both homopolymerization and copolymerization of the perhalo-olefins with other compounds. In instances where homopolymerization is sought to be carried out, as much as 5 per cent of a comonomer, which does not necessarily affect the characteristics of the product, but which is used as a modifier, may be present.

Diphenyldifluoroethylene, useful for effecting the aforementioned copolymerization with trifluorochloroethylene may be prepared by the following series of reactions. In Equation I, following, chloral was reacted with hydrogen fluoride and mercuric oxide, in accordance with the indicated stoichiometrical requirements, to obtain monochlorodifluoro acetaldehyde.

Equation I

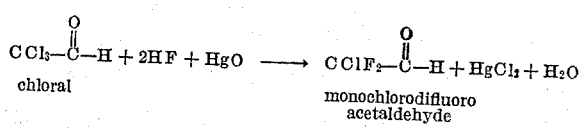

chloral → monochlorodifluoro acetaldehyde

The aqueous mixture of monochlorodifluoro acetaldehyde, separated from the product recovered in Equation I, above, was next reacted, according to Equation II, following, with benzene, according to the indicated stoichiometrical requirements, in the presence of sulfuric acid as a catalyst to produce diphenyldifluorochloroethane.

Equation II

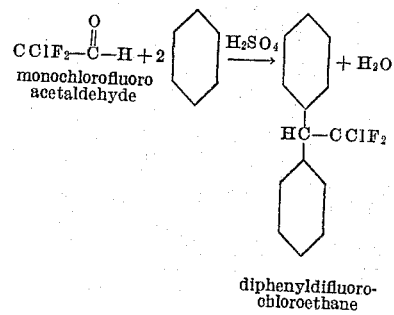

diphenyldifluorochloroethane

The melting point of the above-mentioned diphenyldifluorochloroethane product was found to be 42° C.

The following analytical data were obtained for this compound:

|  | Mol. Wt. | Chlorine Content |
|---|---|---|
| Found | 248.2 | 15.0 |
| Theoretical | 252.6 | 14.04 |

This compound was next subject to dehydrochlorination, employing potassium hydroxide in the presence of dioxane and water, according to Equation III, following, in accordance with stoichiometrical requirements, to produce the desired diphenyldifluoroethylene, as a product of the process.

*Equation III*

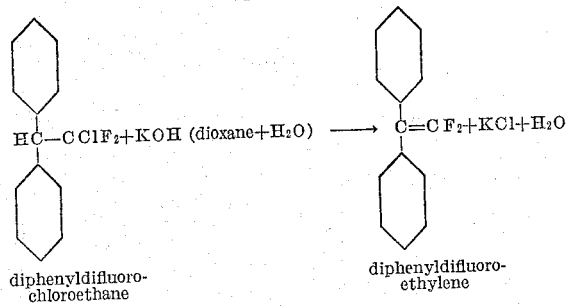

diphenyldifluoro-          diphenyldifluoro-
chloroethane                ethylene The above-mentioned dehydrochlorination reaction was continued until the theoretical requirement of chlorine (Cl$^-$) was produced along with a heavy oil. This oil was distilled through a small unpacked column at 0.3 mm. to obtain a major fraction boiling between about 75° C. and about 85° C.

In the polymerization of trifluorochloroethylene, to which this invention has particular application, to produce either normally liquid or solid perhalo-polymers, the promoter employed is a major factor in effecting the polymerization and determining the molecular weight, yield and characteristics of the product produced. According to the invention, as indicated above, polymerization or copolymerization of perhaloolefins is carried out in the presence of a halogenated acyl peroxide, viz., trifluorodichloropropionyl peroxide, as a promoter.

The concentration of trifluorodichloropropionyl peroxide, used as a promoter in accordance with the process of the invention, is important in determining the molecular weight, yield and characteristics of the product produced. In the case of producing normally solid polymers of the nature of thermoplastics, the amount of promoter used usually varies between about 0.01 and about 0.5 weight per cent of the monomer in the reaction mixture, depending upon the molecular weight of the ultimate product to be produced. In the case of producing normally liquid and waxy polymers, the amount of promoter used varies between about 0.5 and about 10 weight per cent of the monomer in the reaction mixture, with a preferred range between about 2 and about 6 weight per cent of the monomer in the reaction mixture.

In general, it has been observed when producing polymers employing the aforementioned trifluorodichloropropionyl peroxide as a promoter, an increase in the amount of promoter used, within the aforementioned range of concentrations, results in a decrease of the molecular weight of the resulting product. In the case of the solid plastic produced, the N. S. T. value is proportional to the molecular weight and therefore indicates, relatively, the molecular weight of the polymer produced. The N. S. T. value is defined as the no-strength-temperature of the solid polymer.

A no-strength-temperature (N. S. T.) between about 200° C. and about 350° C. is characteristic of a normally solid polymer, produced in accordance with the present process, having plastic characteristics. The most desirable plastic characteristics of the normally solid polymer are observed at N. S. T. values between about 240 and about 350. The no-strength-temperature (N. S. T.) is determined in the following manner:

A sample of polytrifluorochloroethylene is hot pressed into a 1/16" thick sheet and is cut into a strip of 1/8" x 1/16" x 1 5/8". This strip is notched 5/8" from the top of the strip so that the dimension at the notch is 1/16" x 1/16". A fine wire and a standard weight is attached to one end of the strip. The weight of the solid polymer plus the wire and standard weight shall equal ½ gram. The strip is then attached in a furnace and fixed vertically therein. The temperature surrounding the sample inside the furnace is increased at a rate of about 1½° C. per minute in the furnace as the breaking temperature is approached. The no-strength-temperature is the breaking temperature of the sample. Differences of about 5° C. are considered significant.

In producing normally solid polymers, in accordance with the present process, and since the trifluorodichloropropionyl peroxide promoter may be solid under normal conditions and substantially insoluble in the monomer, a solvent is usually employed to dissolve the promoter. The use of the promoter in the form of a solution facilitates handling and intimate admixture of the promoter with the monomer in the reaction zone. Preferred solvents are those which are non-reactive and have a boiling point higher than the boiling point of the monomer. The quantity of solvent containing the promoter, is usually between about 1 and about 20 per cent of the monomer feed, however larger or smaller amounts may be used without departing from the scope of the invention. A preferred solvent is trichlorofluoromethane. The solution of the promoter is maintained at a sufficiently low temperature prior to introduction into the reaction zone in order to minimize decomposition.

When producing normally liquid and waxy polymers, in accordance with the present process, the polymerization of the monomer is also carried out in the presence of a chain-transfer solvent. The amount of chain-transfer solvent used varies between about 20 and about 90 per cent of the monomer in the reaction mixture. In general, an increase in the amounts of chain-transfer solvent results in a lower molecular weight or N. S. T. value of the resulting product of polymerization. A preferred chain-transfer solvent is chloroform, although other chain-transfer solvents may also be employed including carbon tetrachloride, bromotrichloromethane, trichlorotrifluoroethane, 1,2,2-tetrachloroethane, ethylene and saturated halogenated aliphatic compounds, in general, preferably containing bromine or chlorine.

The trifluorodichloropropionyl peroxide may be prepared by first forming trifluorodichloropropionyl chloride (CF$_3$CCl$_2$COCl). Trifluorodichloropropionyl chloride is prepared by bubbling chlorine and oxygen through trifluorotrichloropropene (CF$_3$CCl=CCl$_2$) in the presence of actinic radiation, (for example, ultra-violet light) to produce trifluorodichloropropionyl chloride, as a liquid.

Liquid trifluorodichloropropionyl chloride thus produced, is next reacted with sodium peroxide (Na$_2$O$_2$) suspended in aqueous sodium chloride solution (20% by weight of sodium chloride) to yield the desired trifluorodichloropropionyl peroxide. The quantity of trifluorodichloropropionyl chloride reacted with sodium peroxide is in accordance with stoichiometric requirements, although excess trifluorodichloropropionyl chloride may also be used. The reaction is carried out at a temperature in the range between about −20° C. and about 0° C., and preferably at a temperature of about −16° C., in an open mixing vessel at atmospheric pressure. Reaction takes place almost instantaneously.

The peroxide (trifluorodichloropropionyl peroxide) is recovered from the reaction mixture by extraction with Freon-11 (trichloromonofluoromethane). The peroxide crystallizes when the Freon solution is cooled to about −70° C. and is purified by washing and recrystallizing in fresh Freon-11. The purified peroxide is then dissolved in Freon-11 and diluted to the desired concentration for polymerization.

The following examples will serve to illustrate the method for the preparation of trifluorodichloropropionyl peroxide of the present invention.

EXAMPLE I 21.6 grams of trifluorodichloropropionyl chloride (which is 3.4 grams in excess of the stoichiometric quantity) was reacted with 3.3 grams of sodium peroxide suspended in 248 grams of sodium chloride solution (20% sodium chloride by weight) at −16° C. The above reaction produced a yield of 10.3 grams of trifluorodichloropropionyl peroxide.

EXAMPLE II 18.2 grams of trifluorodichloropropionyl chloride (which is the stoichiometric quantity) was reacted with 3.3 grams of sodium peroxide in 248 grams of sodium chloride solution (20% sodium chloride by weight) at −16° C. The above reaction produced a yield of 10.7 grams of trifluorodichloropropionyl peroxide.

As previously indicated, the homopolymerization or copolymerization of the perhalo-olefin in the presence of the promoter is carried out under suitable conditions of temperature and residence time to produce the desired product. For the production of a plastic polymer, a temperature between about −20° C. and about 150° C. is employed, depending upon the particular promoter and other operating conditions employed. The preferred temperature is between about −20° C. and about 25° C. At a temperature between about 5° C. and about 10° C. trifluorodichloropropionyl peroxide is preferably employed in an amount between about 0.01 and about 0.02 per cent of the monomer in the reaction mixture. The pressure employed should in any case be at least in excess of the vapor pressure of the monomer at the polymerization temperature employed.

When polymerization is effected under liquid phase conditions to produce a normally liquid or waxy polymer, a temperature between about 0° C. and about 300° C. is employed, depending upon the particular chain-transfer solvent and operating conditions employed. A temperature between about 70° C. and about 200° C. is preferred. A sufficiently high pressure at the temperature of polymerization to maintain liquid phase conditions is employed. Excess pressures over those necessary to obtain liquid phase conditions may also be used, ranging as high as 15,000 to 30,000 pounds per square inch gage.

The residence time is defined as the length of time any particular polymerized monomer is retained in the polymerization zone. For the production of liquid or waxy polymers, the residence time to be allowed for completing the reaction and obtaining the desired product and yield, will range from a matter of seconds to as much as 100 hours, preferably between about 1 minute and about 10 hours. The time of polymerization or residence time will effect both yield and molecular weight of the product. However, after a minimum residence time for a given temperature, the effect of continued residence time is less pronounced and does not become a major factor. For example, at a temperature between about 0° C. and about 15° C. a minimum residence time of about 24 hours is required. For the production of a solid plastic polymer, longer periods of residence time are preferred and may range from a matter of minutes to about 8 days.

The use of inert diluents, such as water or hydrocarbon oils, in the polymerization reaction mixture as a means for heat removal and otherwise assuring a smoother reaction, is within the scope of the invention. In indicating concentrations of promoter and monomer, the presence of such diluents is not considered in reporting percentages, but only the presence of the active ingredients, such as monomer, promoter and chain-transfer solvent are considered.

Control of the concentrations may be accomplished by continuous or intermittent addition of the active components of the polymerization reaction as they are consumed or converted, in an amount sufficient to maintain their concentration substantially constant or within the preferred range. In the case of producing normally solid or plastic polymers, the promoter is consumed more rapidly than the monomer. Therefore, the promoter is added at a more rapid rate than the monomer, in continuous operations. In the production of normally liquid polymers, the monomer and promoter are consumed more rapidly than the chain-transfer solvent. Therefore, both monomer and promoter are added more rapidly than the chain-transfer solvent during a continuous polymerization process, in order to maintain their concentration at the desired value.

Figure 2:
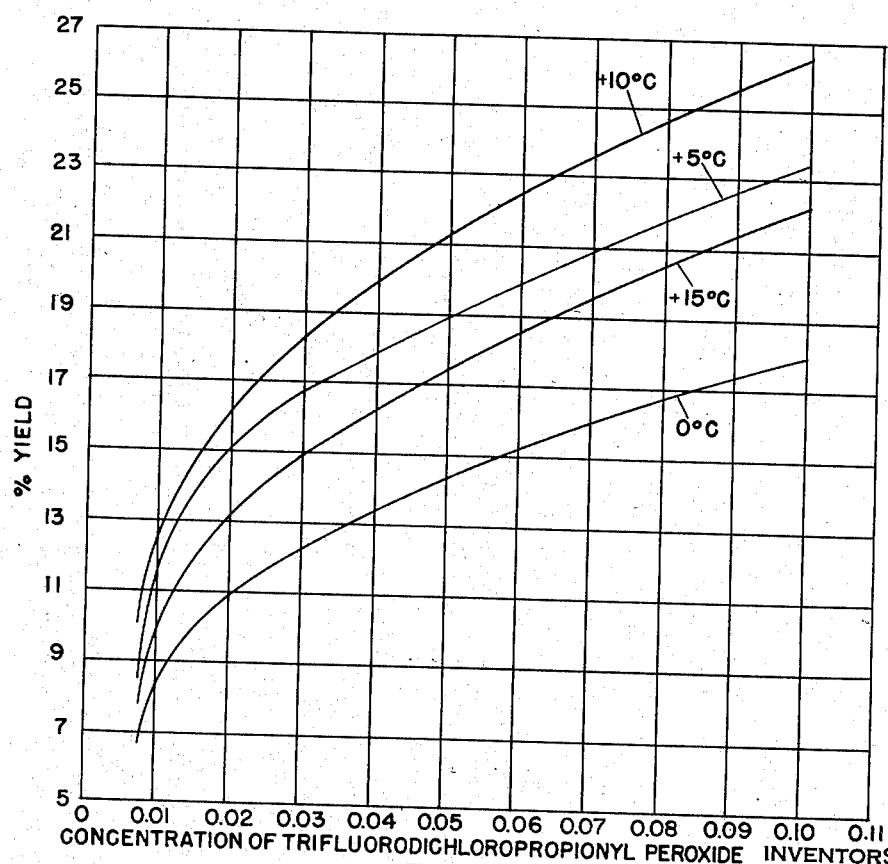

Figures 1 and 2, graphically illustrating the results obtained over periods of 24 hours, indicate that the yield of polymer formed from the monomer trifluorochloroethylene, in accordance with the present process, is proportional to and the N. S. T. is inversely proportional to the peroxide concentration, employing trifluorodichloropropionyl peroxide, as the promoter. It will be noted that the lower concentrations of the peroxide are much more efficient in producing high N. S. T. polymer. An increase in the peroxide concentration of 13.5 times, will increase the polymer yield only about 3 times. The curves in these graphs also indicate the ease with which high yields of the polymer, having N. S. T. values between about 250 and about 275° C. can be obtained.

Figure 3:
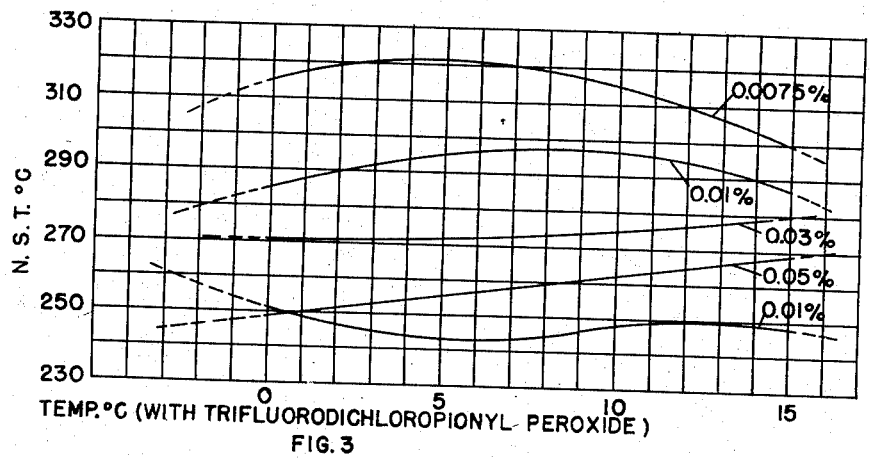
Figure 4:
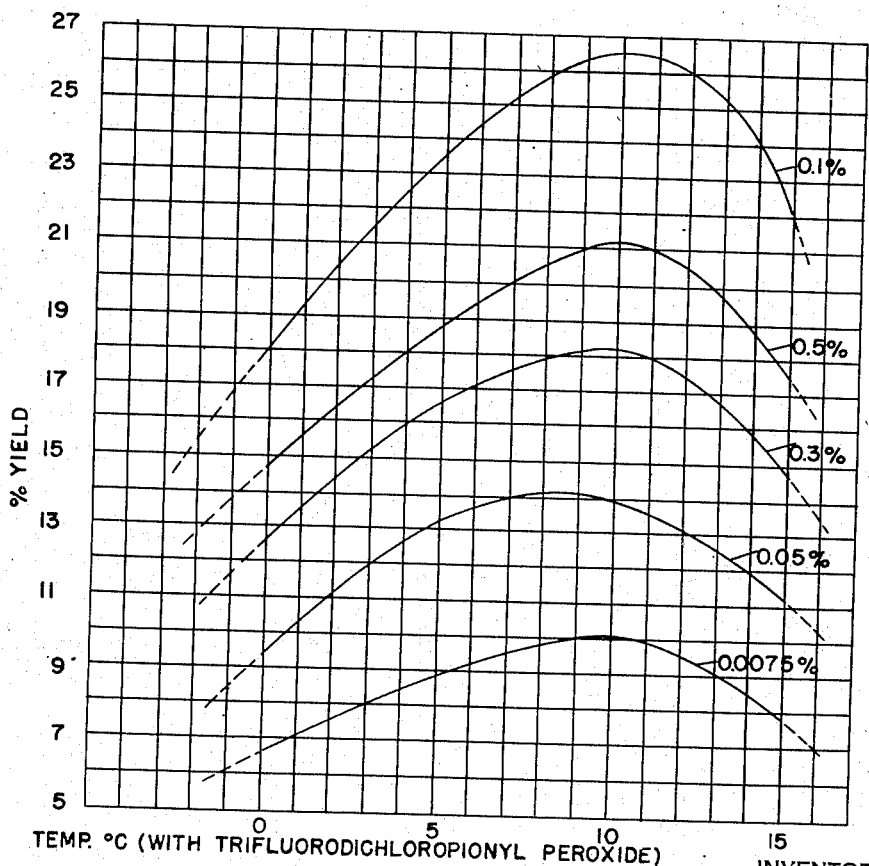

Figures 3 and 4 of the drawings, illustrate the effect of temperature on the efficiency of the peroxide promoter for a given period of time in carrying out the polymerization of trifluorochloroethylene as a monomer, in accordance with the present process. It will be noted that for a 24 hour period, the optimum temperature is about 10° C. The N. S. T. temperature relationship is complicated by the initial formation of low molecular weight polymers. The N. S. T. value is inversely proportional to the polymerization temperature. It will be noted from the curves in Figure 3 that the polymerization temperature has far less effect on the N. S. T. value than on the yield of polymer formed.

Figure 5:
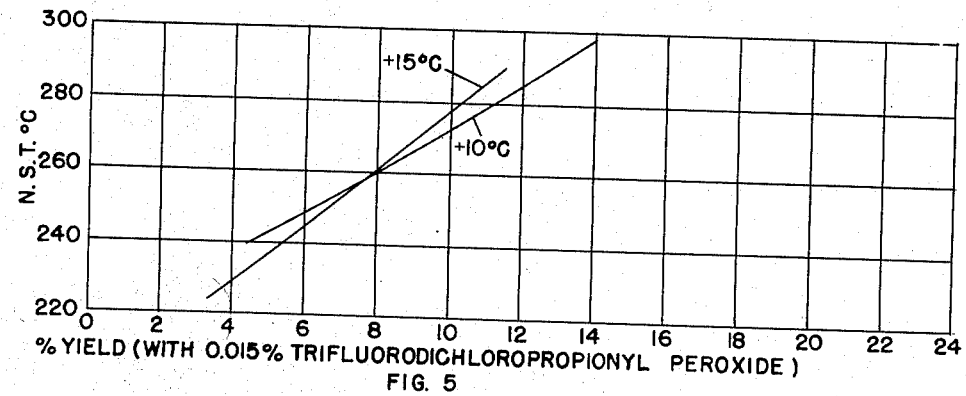
Figure 6:
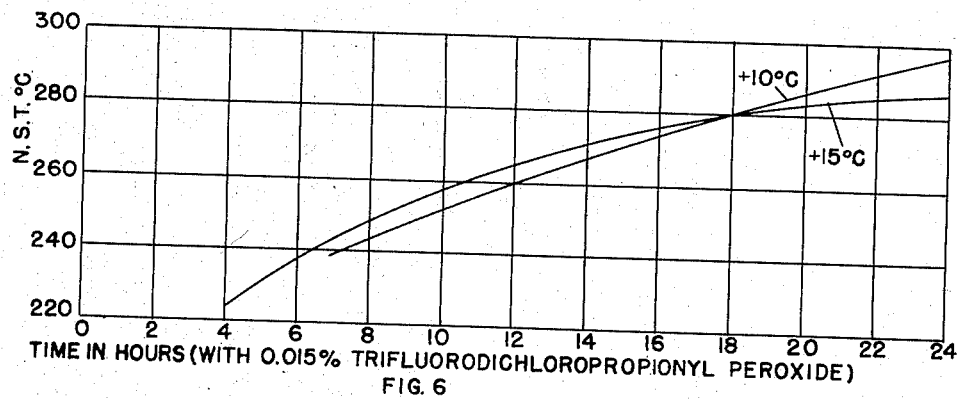
Figure 7:
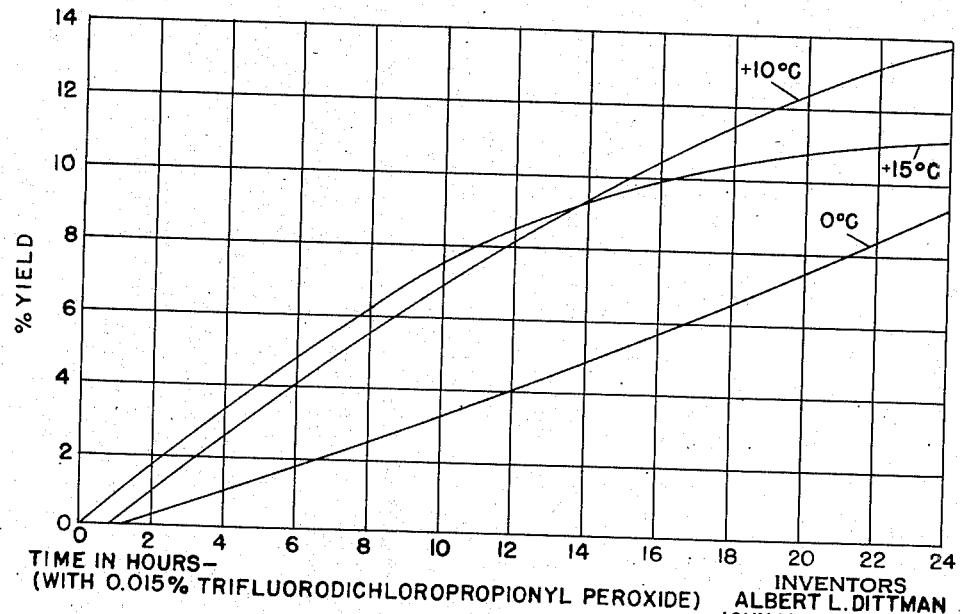

Figures 5, 6 and 7 of the drawing, illustrate the relationship between N. S. T. value, yield, and time when the concentration of promoter is the same in each case, to produce polymers of trifluorochloroethylene in accordance with the process of the present invention. The curves in Figure 7 indicate the effect of temperature in reducing the low initial rate of polymerization. The curves in Figure 5 indicate the sharp increase in N. S. T. value which is proportional to the yield of polymer produced.

From the above data it will be seen that yields of trifluorochloroethylene polymer from about 15 to about 40 per cent, having N. S. T. values between about 250° C. and about 300° C., can be obtained in a period of 24 hours, by employing temperatures between about 10° C. and about 20° C. to carry out the polymerization reaction, in the presence of trifluorodichloropropionyl peroxide promoter.

Various modifications of the aforementioned process of the invention will be apparent to those skilled in the art, without departing from the scope of the invention.

We claim:

1. A process for preparing a plastic trifluorochloroethylene-polymer which comprises: polymerizing trifluorochloroethylene at a temperature between about −20° C. and about 25° C., in the presence of trifluorodichloropropionyl peroxide as a promoter, for a time sufficient to produce a plastic polymer of trifluorochloroethylene; and maintaining the concentration of the promoter between about 0.01 and about 0.5 per cent of trifluorochloroethylene in the reaction mixture.

2. A process for preparing perhalo-polymers which comprises: polymerizing a perhalofluoro-olefin in which the halogens are selected from the group consisting of chlorine and fluorine under conditions of temperature and residence time, and in the presence of trifluorodichloropropionyl peroxide as a promoter, to produce a polymer of the perhalo-olefin as a product of the process.

References Cited in the file of this patent

UNITED STATES PATENTS

| | | |
|---|---|---|
| 2,531,134 | Kropa | Nov. 21, 1950 |
| 2,559,630 | Bullitt | July 10, 1951 |
| 2,564,024 | Miller | Aug. 14, 1951 |
| 2,586,550 | Miller | Feb. 19, 1952 |